H. O. CHOLES.
Stock and Dies for Screw-Threading Pipes, &c.
No. 222,664.  Patented Dec. 16, 1879.
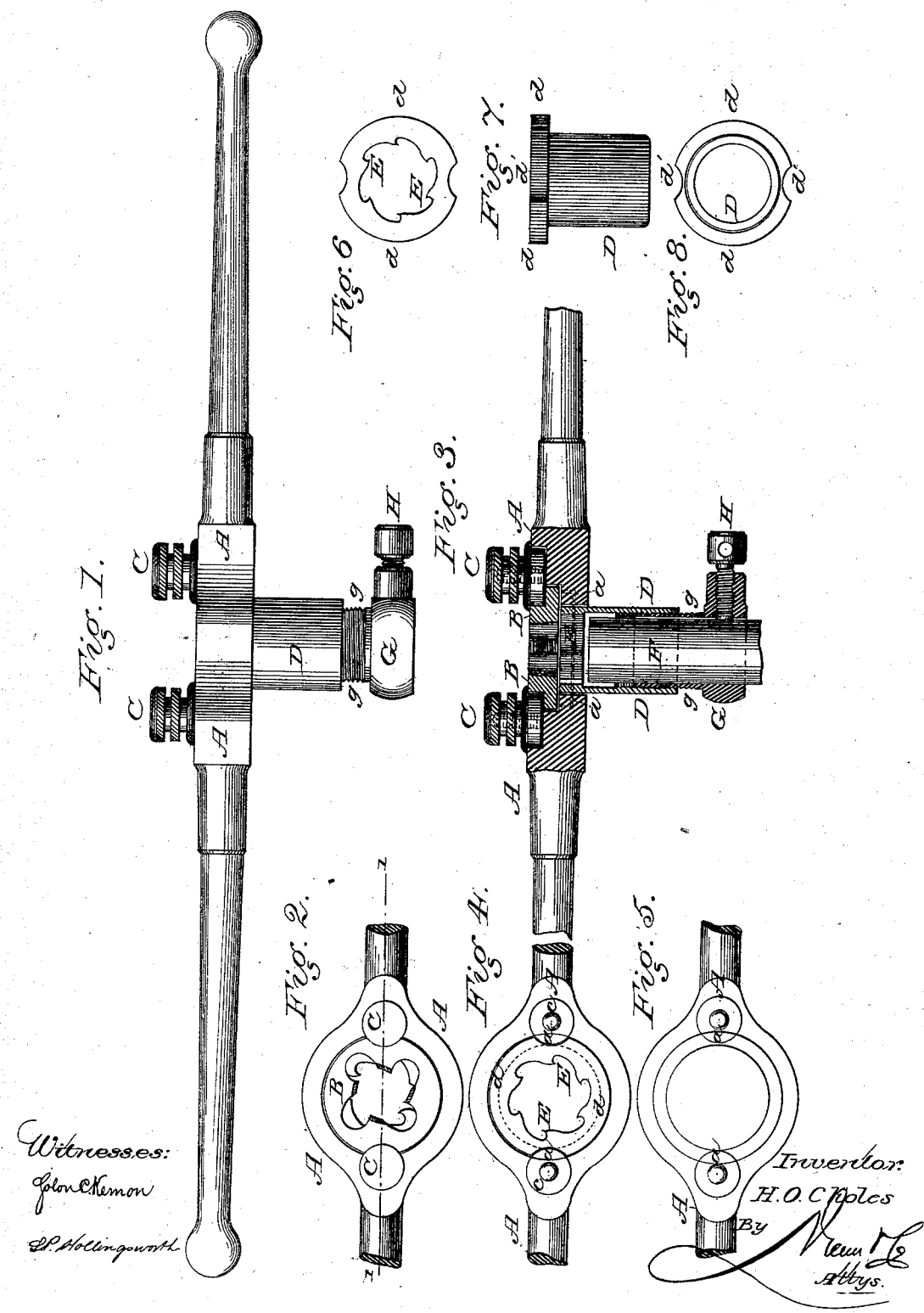

UNITED STATES PATENT OFFICE.

HARRY OSCAR CHOLES, OF UPPER CLAPTON, COUNTY OF MIDDLESEX, ENGLAND.

IMPROVEMENT IN STOCK AND DIES FOR SCREW-THREADING PIPES, &c.

Specification forming part of Letters Patent No. 222,664, dated December 16, 1879; application filed August 16, 1879.

*To all whom it may concern:*

Be it known that I, HARRY OSCAR CHOLES, of Upper Clapton, in the county of Middlesex, England, have invented a new and useful Improvement in Stocks and Dies for Screw-Threading Pipes, &c.; and I do hereby declare that the following is a full, clear, and exact description of the same.

My invention relates to stocks and dies for screw-threading gas and other pipes, bolts, or rods.

My invention has for its object, first, to prepare the pipe for the action of the screw-cutting die by removing the burr, (which is thrown upon the end of the pipe in cutting it to length,) and also the hard outer surface of the pipe, this being done in advance of the screw-cutting die, but at the same operation with the cutting of the screw-thread, instead of at a previous operation, by means of a file, as usual; and, secondly, to feed the die along the pipe as it cuts the screw-thread by means of a leading-screw separate from the die, but combined with the die-stock, instead of relying on the self-feeding action of the die, thereby relieving the die of this part of its work, facilitating the screw-cutting operation, and insuring the formation of a perfectly-true screw-thread.

For the purposes of my invention, the tubular guide through which the pipe passes before entering the die, as usual, is connected to the die-stock in the usual manner by its flanged end being received in a corresponding socket in the stock and keyed therein; and in order to accomplish the first object of my invention, I provide the said guide with a cutter or ring of cutters on the interior at the end next the die, whereby, on rotating the stock in the ordinary way of cutting the screw-thread, the burr and hard outer skin are removed from the pipe just before it enters the die, and at one and the same operation as the cutting of the screw-thread thereby. The ring of cutters being concentric with the die, the end of the tube is accurately guided by the former into the latter.

To accomplish the second object of my invention, the said tubular guide, near the end farthest from the said die, is screw-threaded internally or externally, (preferably the former,) to screw in or on a correspondingly screw-threaded tube or collar firmly clamped on the pipe. This screw is of exactly the same pitch as the screw-thread to be cut on the pipe by the die, and as the guide screws upon it, it thus forms a feed-screw or leading-screw to feed the die along the pipe when in work.

In the accompanying drawings, Figure 1 is an elevation of a die-stock provided with the improvements of my invention. Fig. 2 is a top view thereof, and Fig. 3 is a central section of the same on line 1 1, Fig. 2, showing all the parts in position. Fig. 4 is a top view of the stock, the die and its locking devices being removed therefrom, showing the ring of cutters on the guide. Fig. 5 is a similar view of the stock alone, showing the socket in which the said guide is received. Figs. 6, 7, and 8 are, respectively, a top-end view, elevation, and bottom-end view of the guide alone.

A is the stock, and B the die, locked in its recess therein by milled nuts C, screwing on pins *c* fixed in the stock in recesses formed partly in the stock and partly in the die in which the nuts are received, all as usual. D is the tubular guide, provided with a flange, *d*, at one end received in a correspondingly-rabbeted socket in the stock A, and keyed therein by half-round notches *d'* in the flange *d*, embracing corresponding bosses *a* formed on the stock A and projecting into the rabbet of the socket. The die B and its nuts C hold the guide D securely in place. So far the guide is much the same as usual.

E is an interior ring of cutters formed on the guide D at the end next the die B. Their form is clearly shown in Fig. 4, and they give passage to the pipe F to be screw-threaded, after removing the burr and hard outer skin therefrom. The remainder of the guide D is enlarged internally, so as not to touch the pipe, and is screw-threaded internally to screw upon an externally-threaded tubular portion, *g*, of a collar, G, which fits loosely on the pipe F, and is firmly clamped thereto by means of a set-screw, H. The pipe F being fixed in a vise, or otherwise held, as usual, it will be readily seen how, on rotating the stock, the guide D is caused to traverse the screw $g$, thereby feeding the cutters E and the die B along the tube, the action of the cutters preceding that of the die, as above explained.

It will be obvious, without further illustration, that the guiding-screw may be on the exterior of D and on the interior of $g$, if the latter be made large enough to receive the former within it.

Having thus described my invention, what I claim as new is—

1. In combination with a screw-cutting stock and die, the tubular guide D, provided with the cutters E, and adapted to be screwed onto a feed-screw to which the pipe is secured, substantially as and for the purpose set forth.

2. The combination of the tubular guide D, provided with the cutters E on its upper end, and having its lower end internally screw-threaded, and the feed-screw or collar G externally screw-threaded, and provided with the screw H, with the stock A and the die B, substantially as and for the purpose set forth.

The above specification of my invention signed by me this 30th day of May, 1879.

HARRY OSCAR CHOLES.

Witnesses:
  WM. CLARK,
    *Chancery Lane, London,*
      *Patent Agent.*
  PERCY LYNCH,
    *Clerk.*